(12) United States Patent
Dinan et al.

(10) Patent No.: US 10,178,041 B2
(45) Date of Patent: Jan. 8, 2019

(54) TECHNOLOGIES FOR AGGREGATION-BASED MESSAGE SYNCHRONIZATION

(71) Applicant: Intel Corporation, Santa Clara, CA (US)

(72) Inventors: James Dinan, Hudson, MA (US); Mario Flajslik, Hudon, MA (US); David Keppel, Seattle, WA (US); Ulf R. Hanebutte, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 14/862,854

(22) Filed: Sep. 23, 2015

(65) Prior Publication Data

US 2017/0085442 A1    Mar. 23, 2017

(51) Int. Cl.
*H04L 12/26* (2006.01)
*H04L 12/863* (2013.01)
*H04L 12/801* (2013.01)
*H04L 12/891* (2013.01)
*H04L 12/835* (2013.01)

(52) U.S. Cl.
CPC ............. *H04L 47/62* (2013.01); *H04L 43/04* (2013.01); *H04L 47/10* (2013.01); *H04L 47/30* (2013.01); *H04L 47/41* (2013.01); *H04L 43/16* (2013.01); *Y02D 50/30* (2018.01)

(58) Field of Classification Search
CPC ....... G06F 3/0659; H04L 47/10; H04L 43/04; H04L 43/16
See application file for complete search history.

(56) References Cited

U.S. PATENT DOCUMENTS

| 5,737,535 A * | 4/1998 | Bagley ................. H04L 29/06 709/225 |
| 6,718,370 B1 | 4/2004 | Coffman et al. |
| 2003/0088692 A1 * | 5/2003 | Badovinatz ............ H04L 29/06 709/237 |

(Continued)

OTHER PUBLICATIONS

International search report for PCT application No. PCT/US2016/048162, dated Jun. 26, 2017 (3 pages).

(Continued)

*Primary Examiner* — Jeong S Park
(74) *Attorney, Agent, or Firm* — Barnes & Thornburg LLP (57) ABSTRACT

Technologies for aggregation-based message processing include multiple computing nodes in communication over a network. A computing node receives a message from a remote computing node, increments an event counter in response to receiving the message, determines whether an event trigger is satisfied in response to incrementing the counter, and writes a completion event to an event queue if the event trigger is satisfied. An application of the computing node monitors the event queue for the completion event. The application may be executed by a processor core of the computing node, and the other operations may be performed by a host fabric interface of the computing node. The computing node may be a target node and count one-sided messages received from an initiator node, or the computing node may be an initiator node and count acknowledgement messages received from a target node. Other embodiments are described and claimed.

21 Claims, 6 Drawing Sheets

(56) References Cited

U.S. PATENT DOCUMENTS

| | | | | |
|---|---|---|---|---|
| 2004/0117640 | A1* | 6/2004 | Chu et al. | G06F 21/554 |
| | | | | 713/188 |
| 2005/0172084 | A1* | 8/2005 | Jeddeloh | G06F 13/1642 |
| | | | | 711/154 |
| 2008/0056162 | A1* | 3/2008 | Lal | G01S 5/0284 |
| | | | | 370/255 |
| 2008/0239956 | A1* | 10/2008 | Okholm | H04L 47/10 |
| | | | | 370/232 |
| 2008/0304479 | A1 | 12/2008 | Scott et al. | |
| 2010/0254262 | A1 | 10/2010 | Kantawala et al. | |
| 2011/0078249 | A1* | 3/2011 | Blocksome | G06F 9/544 |
| | | | | 709/206 |
| 2015/0071074 | A1 | 3/2015 | Zaidi et al. | |
| 2015/0188987 | A1* | 7/2015 | Reed | H04L 49/9042 |
| | | | | 709/201 |

OTHER PUBLICATIONS

Written opinion for PCT application No. PCT/US2016/048162, dated Jun. 26, 2017 (9 pages).

* cited by examiner

TECHNOLOGIES FOR AGGREGATION-BASED MESSAGE SYNCHRONIZATION

STATEMENT REGARDING FEDERALLY SPONSORED RESEARCH

This invention was made with Government support under contract number H98230B-13-D-0124 awarded by the Department of Defense. The Government has certain rights in this invention.

BACKGROUND

Many distributed computing systems, including high-performance computing systems, communicate by passing messages between networked computing nodes. Typically, the processor cores of a target node must determine that messages have arrived. For systems that send a high rate of small messages, per-message overhead may reduce message processing rates. To reduce per-message overhead, typical messaging solutions may count events (e.g., the number of messages sent or acknowledgements received). Certain systems may count events using networking hardware, which may reduce or eliminate per-message software overhead. For example, certain systems may support hardware event counters. An event counter may be notionally stored in memory, but in practice is cacheable so that the counter may be updated quickly by the target node without a full round-trip to memory.

Processor cores may poll the value of the counter to determine when the counter value has changed. However, polling on the event counter by the processor core may cause the cache line of the event counter to be invalidated (or downgraded to a shared state) every time the processor attempts to read the event counter. When the next message arrives, the counter increment may be delayed while the networking hardware re-acquires the cache line of the event counter in a writable state. Thus, in some systems, software polling on the event counter may cause the cache line to "bounce" between networking hardware and the processor cache, which may reduce message processing rate. Certain systems may reduce the processor core polling rate so that the cache line stays writable in the networking hardware cache a longer proportion of time. Reducing the polling rate may allow the networking hardware to accept messages at a high rate, but may require a relatively long delay between each core polling event.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
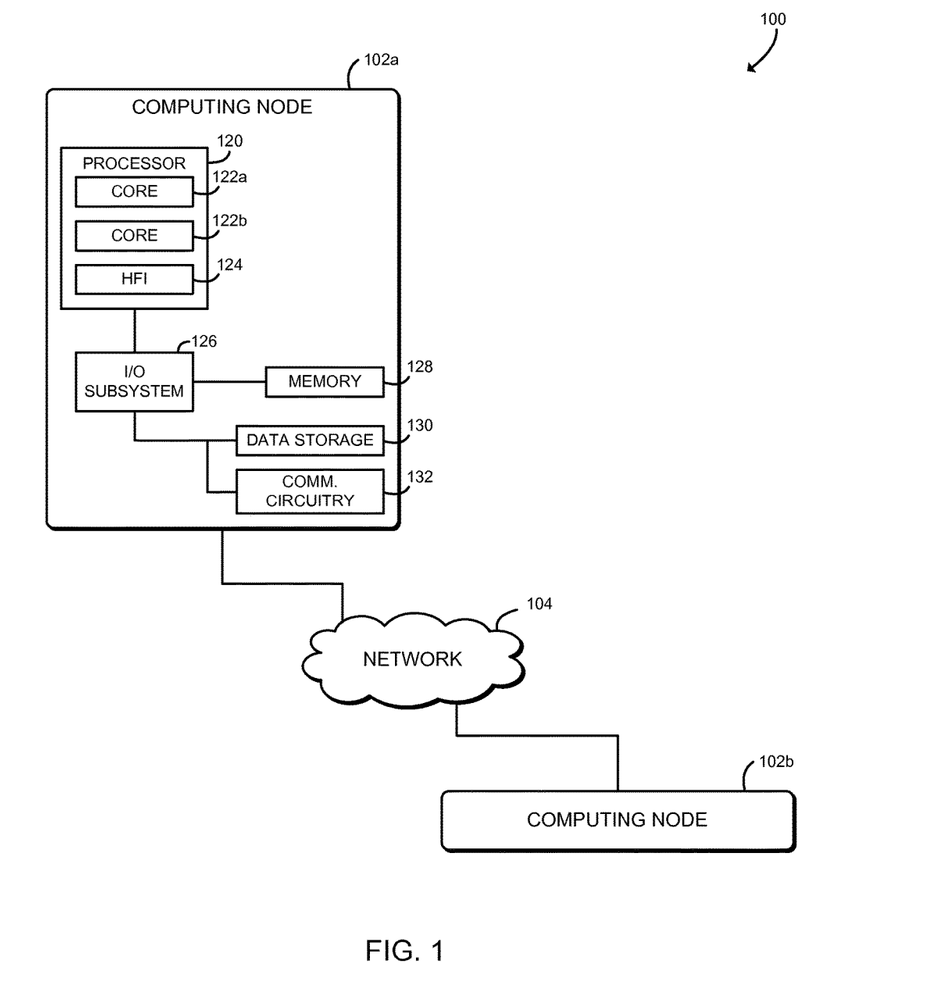
FIG. 1 is a simplified block diagram of at least one embodiment of a system for aggregation-based message synchronization.

Referring now to FIG. 1, in an illustrative embodiment, a system 100 for aggregation-based message synchronization includes several computing nodes 102 in communication over a network 104. The illustrated system 100 includes two computing nodes 102a, 102b; however, it should be understood that the system 100 may include many more computing nodes 102. In use, as described in more detail below, an initiator computing node 102a transmits multiple one-sided memory access messages (e.g., get messages, put messages, atomic operations, or other messages) to a target computing node 102b. The messages may be small and may be sent at a high rate. After receiving each message, the target computing node 102b transmits an acknowledgement message (an ACK) back to the initiator node 102a. Each computing node 102 maintains an event counter that is incremented in response to receiving a message (e.g., a one-sided message or an acknowledgement message). When an event trigger is satisfied based on the value of the event counter, the computing node 102 generates an event that may be consumed by an application of the computing node 102. As described further below, the event counter may be incremented and the event trigger may be evaluated and triggered by dedicated, high-performance network hardware of the computing node 102 such as a host fabric interface.

Figure 2:
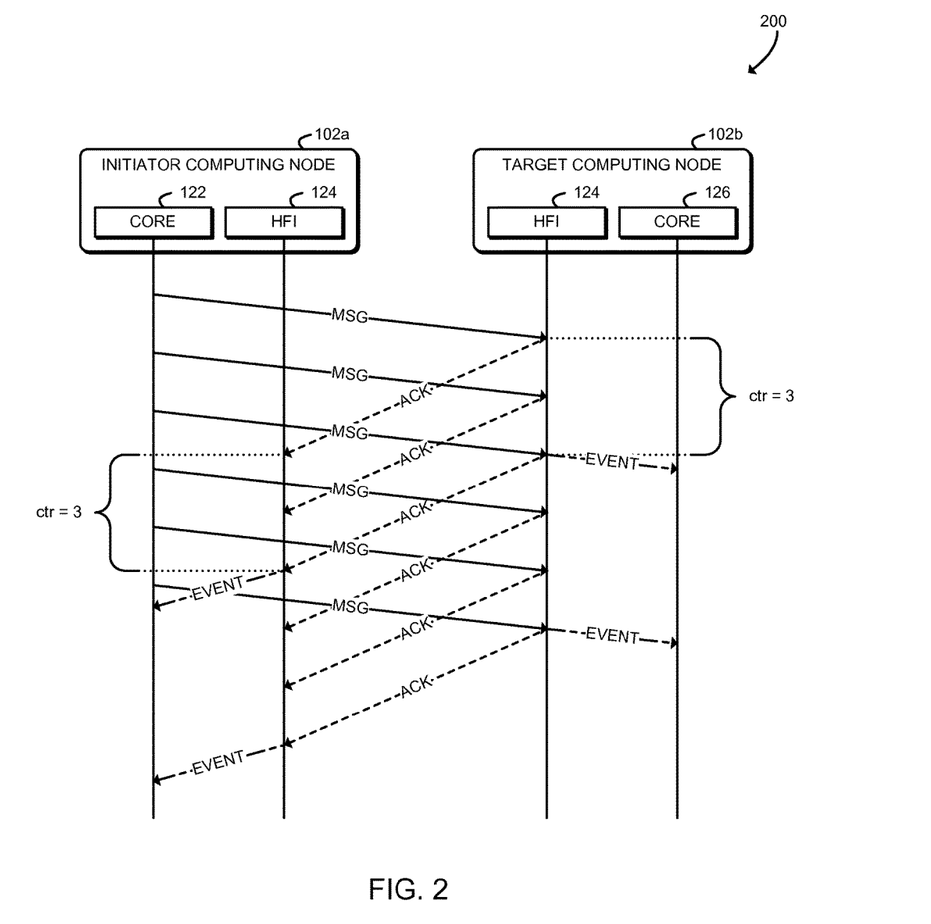
FIG. 2 is a simplified interaction diagram illustrating a technique for aggregation-based message synchronization that may be performed by the system of FIG. 1.

Referring now to FIG. 2, an interaction diagram 200 illustrates a technique for aggregation-based message synchronization that may be performed by the system 100. As shown, the initiator computing node 102a transmits a series of one-sided messages MSG to the target computing node 102b. Each MSG is generated by a processor core 122 of the initiator computing node 102a and is received by a host fabric interface 124 of the target computing node 102b. In response to each MSG, the host fabric interface 124 of the target computing node 102b transmits an acknowledgement message ACK, which is received by the host fabric interface 124 of the initiator computing node 102a. The host fabric interface 124 of the initiator computing node 102a increments an event counter after receiving each ACK, and when a predefined trigger value is reached, the host fabric interface 124 generates an event that is consumed by the processor core 122. In the illustrative embodiment, the trigger value is three ACKs; however the trigger value may be set to a different value by the processor core 122. Further, as described below, the processor core 122 may monitor for the event using any appropriate technique, including polling an event queue in memory.

Similarly, the host fabric interface 124 of the target computing node 102b increments an event counter after receiving each MSG, and when a predefined trigger value is reached, the host fabric interface 124 generates an event that is consumed by the processor core 122. In the illustrative embodiment, the trigger value is three MSGs, however the trigger may be set to a different value by the processor core 122. Although illustrated as separate computing nodes 102a, 102b, it should be understood that a single computing node 102 may perform both initiator node and target node functions. Additionally, the initiator node function and the target node function of a computing node 102 may both use the same event queue and/or event counters.

Thus, the system 100 may process messages without software polling an in-memory event counter, which may improve performance by preventing cache line bouncing between the host fabric interface and the processor cache, and by preventing other overhead. Additionally, the system 100 may allow software to poll the event queue without throttling or otherwise artificially reducing the polling rate, which may reduce latency or other delays before the processor cores 122 can process messages. Thus, the system 100 may improve the speed of overall progress by reducing undesirable delayed work and avoiding cascading work delays (e.g., avoiding delays for results that are then used to enable further communication and further work). Additionally, by reducing delays, the system 100 may reduce delayed resource re-use. Messages often use temporary storage or other resources, but the resources from a first message cannot be re-used for a second message until all needs from the first message have been satisfied and the resources have been released. Delays in re-use may cause messaging to run out of memory or other resources and thus delay messaging, even when there is completed work that is ready for messaging and could otherwise proceed. The system 100 may also support hardware offloading to eliminate per-message processing overheads while still enabling fast buffer reuse and computation-communication overlap.

In addition to potential performance improvements, in some embodiments, offloading event aggregation to networking hardware may allow the computing node 102 to put one or more processor cores to sleep, which may improve power consumption. Accordingly, the system 100 may be used to efficiently implement one or more message synchronization operations (e.g., the shmem_quiet( ) function of the SHMEM messaging system) without polling on an event counter. Additionally the system 100 may be used to provide a more efficient technique to wait on an event counter, for example in conjunction with a SHMEM counting puts proposal as described in James Dinan et al., "Reducing Synchronization Overhead Through Bundled Communication," *OpenSHMEM & Related Techs. Experiences, Implementations & Tools*, 163-77 (2014). The system 100 may also be used to support synchronization across multiple contexts in conjunction with a SHMEM contexts proposal as described in James Dinan & Mario Flajslik, "Contexts: A Mechanism for High Throughput Communication in Open-SHMEM," *Proc. of the 8th Int'l Conf on Partitioned Global Address Space Programming Models* (2014).

Referring again to FIG. 1, each computing node 102 may be embodied as any type of computation or computer device capable of performing the functions described herein, including, without limitation, a computer, a server, a rack-mounted server, a high-performance computing node; a desktop computer, a workstation, a laptop computer, a notebook computer, a tablet computer, a mobile computing device, a wearable computing device, a network appliance, a distributed computing system, a processor-based system, and/or a consumer electronic device. As shown in FIG. 1, the computing node 102 illustratively includes a processor 120, an input/output subsystem 126, a memory 128, a data storage device 130, and communication circuitry 132. Of course, the computing node 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The illustrative processor 120 is a dual-core processor 120 having two processor cores 122, each of which is an independent processing unit capable of executing programmed instructions. It should be understood that in other embodiments the processor 120 may be embodied as a single or multi-core processor(s), digital signal processor, microcontroller, or other processor or processing/controlling circuit.

The illustrative processor 120 further includes a host fabric interface 124. The host fabric interface 124 may be embodied as any communication interface, such as a network interface controller, communication circuit, device, or collection thereof, capable of enabling communications between the processor 120 and other remote computing nodes 102 and/or other remote devices over the network 104. The host fabric interface 124 may be configured to use any one or more communication technology and associated protocols (e.g., Ethernet, InfiniBand®, Intel® Omni-Path Architecture, etc.) to effect such communication. In some embodiments, the host fabric interface 124 may expose an interface that is similar to a low-level network application programming interface, such as the Portals network programming interface. Although illustrated as being included in the processor 120, it should be understood that in some embodiments the host fabric interface 124 may be a separate component of the computing node 102 or included in a separate component of the computing node 102, such as a network interface controller or a network interface card. Additionally or alternatively, although illustrated as including a single processor 120, it should be understood that each computing node 102 may include multiple processors 120, and each processor 120 may include an integrated host fabric interface 124.

The memory 128 may be embodied as any type of volatile or non-volatile memory or data storage capable of performing the functions described herein. In operation, the memory 128 may store various data and software used during operation of the computing node 102 such as operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing node 102. For example, the I/O subsystem 126 may be embodied as, or otherwise include, memory controller hubs, input/output control hubs, platform controller hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing node 102, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The communication circuitry 132 of the computing node 102 may be embodied as any communication circuit, device, or collection thereof, capable of enabling communications between the computing node 102 and one or more remote computing nodes 102 and/or other remote devices over the network 104. The communication circuitry 132 may be configured to use any one or more communication technology (e.g., wired or wireless communications) and associated protocols (e.g., Ethernet, InfiniBand®, Intel® Omni-Path Architecture, Bluetooth®, Wi-Fi®, WiMAX, etc.) to effect such communication.

As discussed in more detail below, the computing nodes 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

Figure 3:
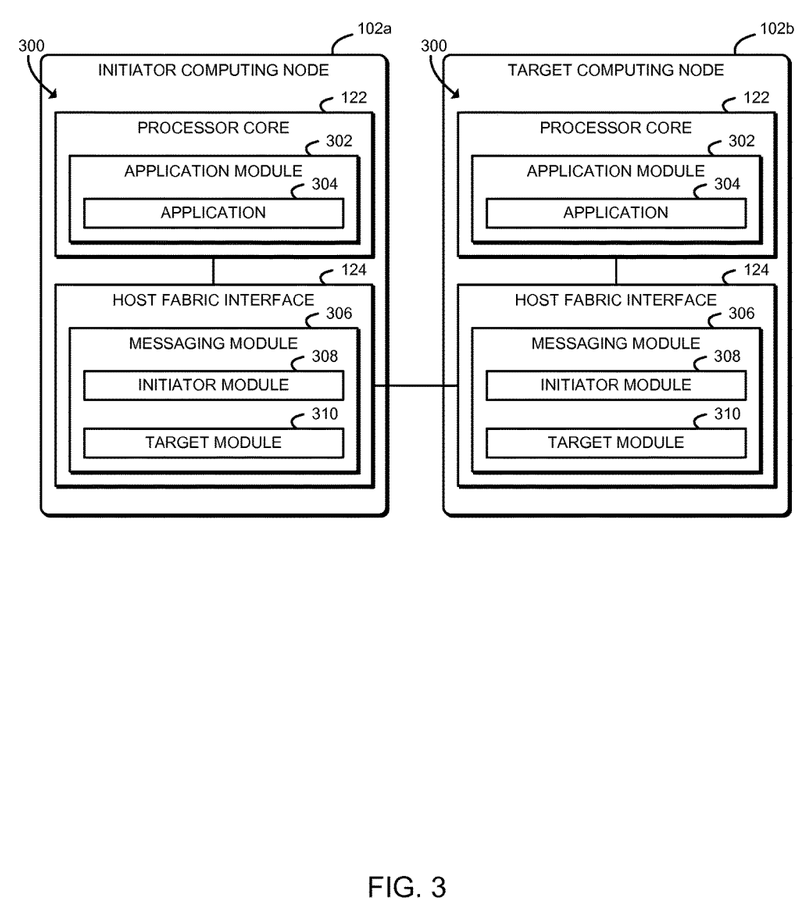
FIG. 3 is a simplified block diagram of at least one embodiment of an environment that may be established by computing nodes of the system of FIG. 1.

Referring now to FIG. 3, in an illustrative embodiment, each computing node 102 establishes an environment 300 during operation. In the illustrative embodiment, the computing node 102a is shown as the initiator node and the computing node 102b is shown as the target node; however, as shown, both computing nodes 102a, 102b may establish the same environment 300, and thus the roles of those computing nodes 102a, 102b may be reversed and/or combined in some embodiments. For example, in some embodiments the computing node 102a may act as both the initiator and the target with respect to messages exchanged with the computing node 102b, and vice-versa.

The illustrative environment 300 includes an application module 302 and a messaging module 306. The various modules of the environment 300 may be embodied as hardware, firmware, software, or a combination thereof. For example the various modules, logic, and other components of the environment 300 may form a portion of, or otherwise be established by, the processor 120, the host fabric interface 124, or other hardware components of the computing node 102. As such, in some embodiments, any one or more of the modules of the environment 300 may be embodied as a circuit or collection of electrical devices (e.g., an application circuit 302 and/or a messaging circuit 306).

The application module 302 is configured to monitor, by an application 304 of the computing node 102, an event queue for a completion event. The application 304 may be embodied as any executable code, native code, managed code, user application, system application, or other program that is executed by the computing node 102 and sends and/or receives messages with one or more remote computing nodes 102. As described further below, the event queue may be embodied as one or more data structures in the memory 128, such as a circular buffer. The application 304 may monitor the event queue, for example, by polling the event queue in the memory 128 or by blocking on the event queue. The application module 302 may be configured to write, by the application 304, one or more messages to a message buffer included in the memory 128. The application module 302 may be further configured to process, by the application 304, the message buffer in the memory 128 in response to determining that the completion event has been written to the event queue. The application module 302 may be hosted, executed, or otherwise established by one or more of the processor cores 122 of the processor 120. Thus, the application 304 may be executed by a processor core 122.

The messaging module 306 is configured to receive a message from a remote computing node 102, increment an event counter in response to receiving the message, determine whether an event trigger is satisfied after incrementing the event counter, and write a completion event to the event queue if the event trigger is satisfied. The messaging module 306 may be hosted, executed, or otherwise established by the host fabric interface 124. Thus, those operations of the messaging module 306 may be performed independently of the processor cores 122.

In some embodiments, the computing node 102 may function as an initiator computing node 102a. In those embodiments, the messaging module 306 may be configured to transmit initiator messages (e.g., one-sided messages such as get messages, put messages, or atomic operations) from the message buffer to the remote computing node 102. In those embodiments, the computing node 102a receives acknowledgement messages from the remote computing node 102b in response to transmission of the original initiator messages and increments the event counter in response to receiving each acknowledgement message. In those embodiments, the messaging module 306 may be configured to determine whether the event trigger is satisfied by comparing the event counter to the number of initiator messages originally transmitted.

Additionally or alternatively, in some embodiments the computing node 102 may function as a target computing node 102b. In those embodiments, the messaging module 306 may be configured to receive initiator messages in a message buffer in the memory 128 and to increment the event counter in response to receiving each initiator message. The messaging module 306 may be configured to increment the event counter by one in response to receiving each initiator message. In those embodiments, the messaging module 306 may be configured to determine whether the event trigger is satisfied by comparing the event counter to a predetermined count of how many initiator messages are expected. In some embodiments, the messaging module 306 may be configured to increment the event counter based on the size of the initiator message (e.g., by the number of bytes in the message). In those embodiments, the messaging module 306 may be configured to determine whether the event trigger is satisfied by determining whether the event counter has a predefined relationship to a size of the message buffer (e.g., by determining whether the message buffer is full). The messaging module 306 may be further configured to receive additional initiator messages in a new message buffer when the original buffer is full, based on dependencies established between the message buffers. It should be understood that the functions of the messaging module 306 may be performed by one or more sub-modules, such as an initiator module 308 and/or a target module 310.

Figure 4:
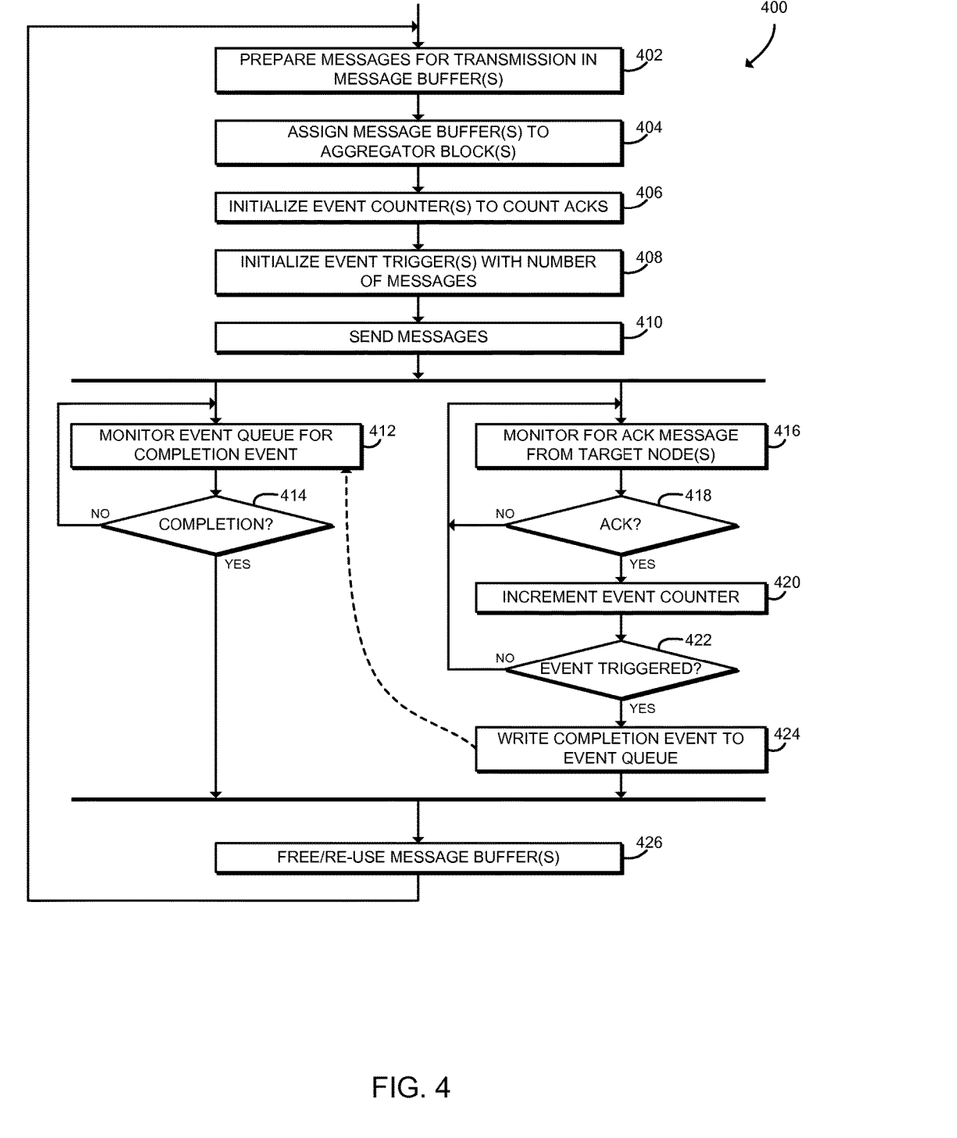
FIG. 4 is a simplified flow diagram of at least one embodiment of a method for initiator node message processing that may be executed by a computing node of the system of FIGS. 1 and 3.

Referring now to FIG. 4, in use, a computing node 102a may execute a method 400 for initiator node message processing. The method 400 begins with block 402, in which the computing node 102a prepares messages for transmission in one or more message buffers in the memory 128 of the computing node 102a. The messages may be embodied as, for example, one-sided messages such as get messages or put messages, atomic update messages, or other messages. Because the computing node 102a acts as an initiator node, those messages may be known as initiator messages. The computing node 102a may prepare the messages for transmission, for example, by copying them in an appropriate format into the message buffer. One or more of the processor cores 122 may prepare the messages, for example by executing the application 304.

In block 404, the computing node 102a assigns each message buffer to an aggregator block. An aggregator block may be embodied as a logical structure including a memory buffer, an event counter, an event trigger, and/or other components that are used to generate aggregated message synchronization events. The computing node 102a may establish multiple aggregator blocks, and each aggregator block may be associated with a dedicated message buffer. The message buffers may be separate or may each be part of a larger, contiguous memory buffer including the messages. The processor core 122 may assign each message buffer to an aggregator block by sending one or more commands to the host fabric interface 124.

Figure 5:
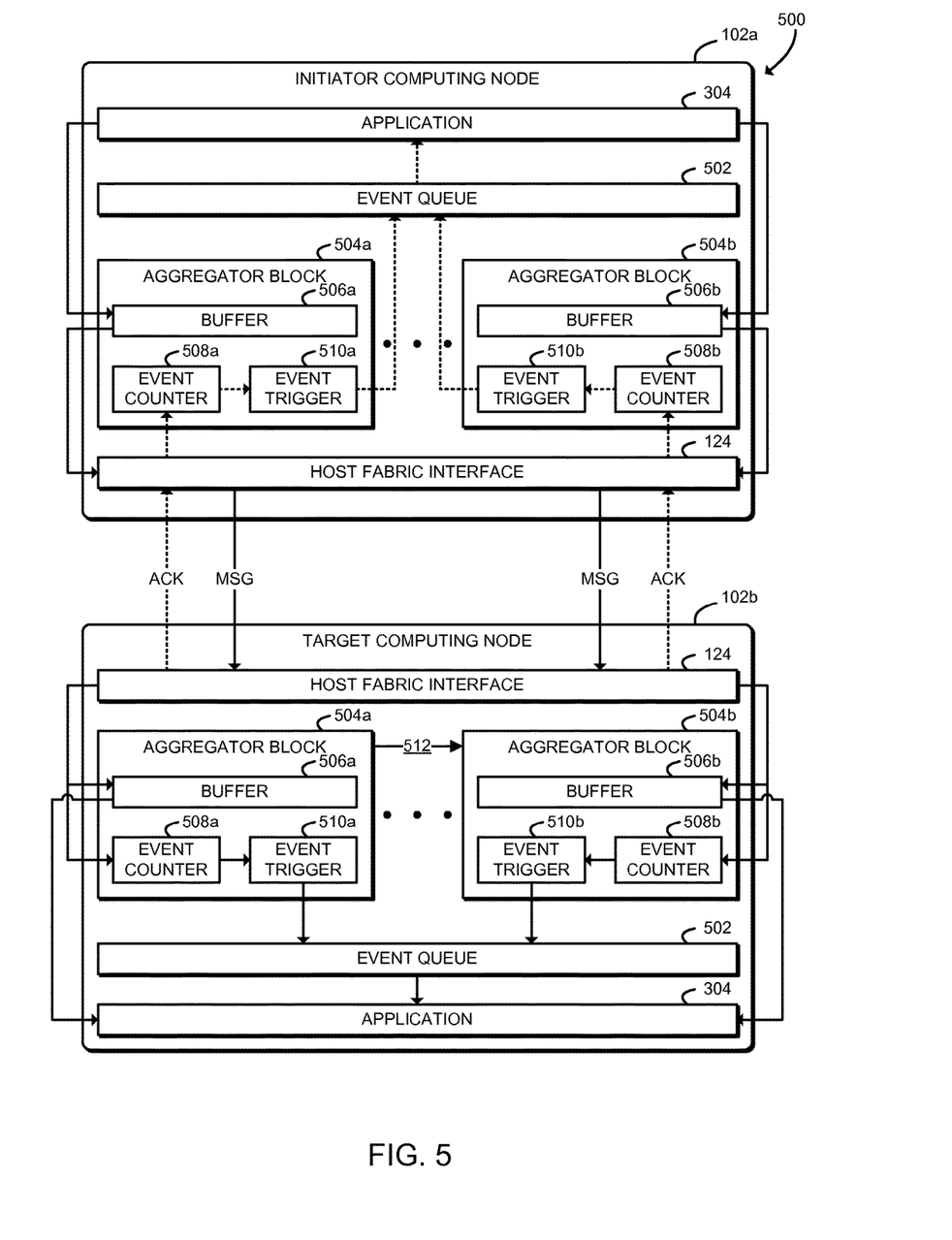
FIG. 5 is a schematic diagram illustrating a mechanism for aggregation-based message synchronization that may be used by the system of FIGS. 1 and 3.

Referring now to FIG. 5, schematic diagram 500 illustrates at least one embodiment of a message aggregation mechanism that may be established by the system 100. As shown, each computing node 102 establishes an event queue 502 (described further below) and one or more aggregator blocks 504. In the illustrative embodiment, the initiator computing node 102a establishes two aggregator blocks 504a, 504b; however, it should be understood that the initiator computing node 102a may a different number of aggregator blocks 504 (e.g., one aggregator block 504 or three or more aggregator blocks 504). As shown, each aggregator block 504 includes a buffer 506, an event counter 508, and an event trigger 510. The buffer 506 is associated with a particular memory buffer in the memory 128, which may contain messages prepared by the application 304 for transmission to the target computing node 102b. Each aggregator block 504 is assigned to a separate buffer 506, and the buffers 506 may each be part of a larger buffer. For example, in the illustrative embodiment the buffers 506a, 506b may each be part of a larger, contiguous buffer in the memory 128. Additionally, although each aggregator block 504 is illustrated as including messages for transmission to a single target computing node 102b, it should be understood that in some embodiments, a single aggregator block 504 may be used for aggregating an initiator computing node 102a with many target computing nodes 102b.

Referring back to FIG. 4, in block 406 the computing node 102a initializes an event counter 508 associated with each message buffer 506 to count acknowledgement messages (ACKs) received. The processor core 122 may initialize the event counter 508 by sending one or more commands to the host fabric interface 124. The computing node 102a may initialize an event counter 508 for each message buffer 506 that includes messages for transmission to the target computing node 102b.

In block 408, the computing node 102a initializes an event trigger 510 associated with each event counter 508 with the number of messages to be transmitted by the aggregator block 504. The computing node 102a may use any appropriate technique to initialize the event trigger 510. For example, in some embodiments, the computing node 102a may generate a triggered put message directed at the current computing node 102a that is triggered when the event counter 508 reaches the number of acknowledgment messages that the event trigger 510 was initialized to. The triggered put message may be processed in hardware by the host fabric interface 124. The computing node 102a may initialize an event trigger 510 for each event counter 508 that is associated with messages for transmission to the target computing node 102b.

In block 410, the computing node 102a sends the messages from the message buffer(s) 506 to the target computing node 102b. The computing node 102a may use any technique for sending the messages. For example, a processor core 122 may offload sending the messages to the host fabric interface 124, and the host fabric interface 124 may transmit the messages independently of the processor core 122. Although illustrated as preparing the message buffers 506, initializing the event counters 508, and initializing the event triggers 510 sequentially, it should be understood that in some embodiments those operations may be performed in a different order and/or independently. For example, the computing node 102a may initialize the event counters 508 and/or the event triggers 510 and then send messages through the message buffers 506.

After transmitting the messages, the method 400 proceeds in parallel to blocks 412, 416. As described further below, the block 412 may be executed by a processor core 122 of computing node 102a, and the block 416 may be executed by the host fabric interface 124 of the computing node 102a. In block 412, the computing node 102a monitors the event queue 502 for a completion event. The event queue 502 may be embodied as a buffer or other structure in the memory 128. For example, in the illustrative embodiment the event queue 502 is a circular buffer. The computing node 102a may use any technique to monitor the event queue 502, including polling the event queue 502 for changes, blocking on the event queue, waiting for an interrupt, or any other appropriate technique. For example, the processor core 122, executing the application 304, may repeatedly read the event queue 502 from memory to detect a new completion event. As described further below, the host fabric interface 124 may independently write the completion event to the event queue 502 while the processor core 122 is monitoring the event queue 502. In block 414, the computing node 102 determines whether a completion event has been detected. If not, the method 400 loops back to block 412 to continue monitoring the event queue 502. If a completion event has been detected, the method 400 advances to block 426, described below.

Referring back to block 410, as described above, after sending the messages, the method 400 advances in parallel to the blocks 412, 416. In block 416, the host fabric interface 124 of the computing node 102a monitors for an acknowledgement message (ACK) from the target computing node 102b. The target computing node 102b sends an ACK back to the initiator computing node 102a after receiving a message transmitted by the initiator node 102a. As described above, the host fabric interface 124 monitors for the ACK at the same time that the processor core 122 may monitor the event queue 502. In block 418, the host fabric interface 124 determines whether an ACK has been received. If not, the method 400 loops back to block 416 to continue monitoring for ACKs. If an ACK has been received, the method 400 advances to block 420.

In block 420, the host fabric interface 124 increments an event counter 508. The host fabric interface 124 increments the event counter 508 that is associated with the aggregator block 504 and/or the message buffer 506 of the original message transmitted to the target computing node 102b. The event counter 508 may be embodied as any storage location that may be accessed by the host fabric interface 124. For example, the event counter 508 may be embodied as a location in the memory 128 and/or a cache, register, or other memory location local to the host fabric interface 124. The event counter 508 may be accessible to the processor core 122 (for example, through a coherent cache); however, as described above in connection with the block 412, the processor core 122 monitors the event queue 502 and not the event counter 508.

In block 422, the host fabric interface 124 determines whether the event trigger 510 has been satisfied. For example, the host fabric interface 124 may compare the value of the event counter 508 with a predefined value that was assigned by a processor core 122 as described above in connection with block 408. Thus, the event trigger 510 may be satisfied after the host fabric interface 124 has received a number of ACKs equal to the number of messages originally transmitted to the target computing node 102b. If the event trigger 510 is not satisfied, the method 400 loops back to block 416 to continue monitoring for ACKS. If the event trigger 510 is satisfied, the method 400 advances to block 424.

In block 424, the host fabric interface 124 writes a completion event to the event queue 502. As described above, the event queue 502 may be embodied as a buffer or other structure in the memory 128. The completion event may include data that may be used to identify the aggregator block 504 and/or message buffer 506 that generated the completion event. For example, in systems similar to the Portals network programming interface, the completion event may be generated by a triggered put message to the computing node 102a. When the trigger of the triggered put (i.e., the event trigger 510) is satisfied, the host fabric interface 124 writes the completion event to the event queue 502. The triggered put may be configured to generate a full event with an appropriate user_ptr field that describes the appropriate aggregator block 504. As described above, after the completion event is written to the event queue 502, execution of the method 400 from block 414 joins execution of the method 400 from block 424, and the method 400 proceeds to block 426.

In block 426, the computing node 102a frees and/or re-uses the message buffer 506 associated with the completion event. A processor core 122 of the computing node 102a may free the buffer, adjust one or more memory pointers, or otherwise make the memory 128 associated with the buffer 506 available for reuse. Because the completion event is triggered after a number of messages have been transmitted and acknowledged, the processor core 122 is effectively able to complete or otherwise process all of those messages in response to a single event. Additionally, the computing node 102a frees the aggregator block 504 associated with the completion event, for example by marking the aggregator block 504 as free, marking the aggregator block 504 as "free to reuse," placing the aggregator block 504 back on a free aggregator list, or performing any other technique to allow aggregator block 504 reuse. After freeing the message buffers 506 and aggregator blocks 504, the method 400 loops back to block 402, in which the computing node 102a may prepare additional messages for transmission to the target computing node 102b.

Figure 6:
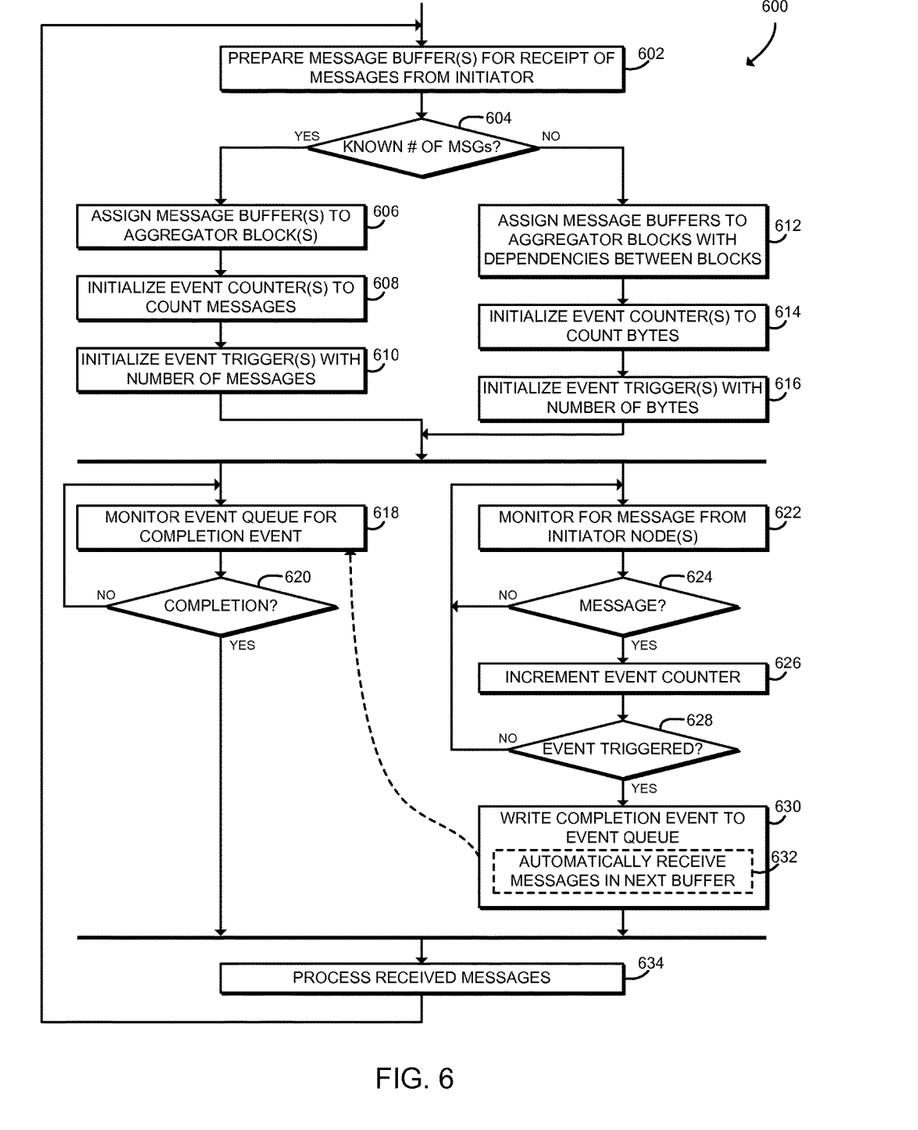
FIG. 6 is a simplified flow diagram of at least one embodiment of a method for target node message processing that may be executed by a computing node of the system of FIGS. 1 and 3.

Referring now to FIG. 6, in use, a computing node 102b may execute a method 600 for target node message processing. The method 600 begins with block 602, in which the computing node 102b prepares one or more message buffers for receipt of messages from the initiator computing node 102a. As described above, the messages may be embodied as, for example, one-sided messages such as get messages or put messages, atomic update messages, or other messages. One or more of the processor cores 122 may prepare the message buffer, for example by executing the application 304.

In block 604, the computing node 102b determines whether a known number of messages will be received. For example, the application 304 may be configured to receive a known number of messages or to receive an unknown number of messages. If an unknown number of messages will be received, the method 600 branches to block 612, described below. If a known number of messages will be received, the method 600 branches to block 606.

In block 606, the computing node 102b assigns each message buffer to an aggregator block. As described above, and as illustrated in FIG. 5, an aggregator block 504 may be embodied as a logical structure including a message buffer 506, an event counter 508, an event trigger 510, and/or other components used to generate aggregated message synchronization events. The computing node 102b may establish multiple aggregator blocks 504, and each aggregator block 504 may be associated with a dedicated message buffer 506 that will receive messages from the initiator computing node 102a. The message buffers 506 may be separate or may each be a part of a larger, contiguous memory buffer. The processor core 122 may assign each message buffer 506 to an aggregator block 504 by sending one or more commands to the host fabric interface 124. Additionally, although each aggregator block 504 is illustrated as receiving messages from a single initiator computing node 102a, it should be understood that in some embodiments, a single aggregator block 504 may be used for aggregating a target computing node 102b with many initiator computing nodes 102a.

In block 608 the computing node 102b initializes an event counter 508 associated with each message buffer 506 to count messages received from the initiator computing node 102a. The processor core 122 may initialize the event counter 508 by sending one or more commands to the host fabric interface 124. The computing node 102b may initialize an event counter 508 for each message buffer 506 that receives messages from the initiator computing node 102a.

In block 610, the computing node 102b initializes an event trigger 510 associated with each message buffer 506 with the number of messages that are expected to be received from the initiator computing node 102a. The computing node 102b may use any appropriate technique to initialize the event trigger 510. For example, in some embodiments, the computing node 102b may generated a triggered put message directed at the current computing node 102b that is triggered on the number of messages expected to be received. The triggered put message may be processed in hardware by the host fabric interface 124. The computing node 102b may initialize an event trigger 510 for each message buffer 506 that will receive messages from the initiator computing node 102a. After initializing the event triggers 510, the method 600 proceeds in parallel to blocks 618, 622 as described below.

Referring back to block 604, if the computing node 102b determines that an unknown number of messages will be received, the method 600 branches to block 612. In block 612, the computing node 102b assigns each message buffer 506 to an aggregator block 504 with appropriate dependencies set between the aggregator blocks 504. As described above, and as illustrated in FIG. 5, an aggregator block 504 may be embodied as a logical structure including a message buffer 506, an event counter 508, an event trigger 510, and/or other components used to generate aggregated message synchronization events. The computing node 102b may establish multiple aggregator blocks 504, and each aggregator block 504 may be associated with a dedicated message buffer 506 that will receive messages from the initiator computing node 102a. The message buffers 506 may be separate or may each be a part of a larger, contiguous memory buffer. FIG. 5 illustrates a dependency 512 established between the aggregator blocks 504a and 504b of the target computing node 102b. As described further below, dependencies between aggregator blocks 504 allow the host fabric interface 124 to automatically store messages in a new buffer 506 when the current buffer 506 is filled. For example, in the illustrative embodiment, when the buffer 506a is filled with messages, the host fabric interface 124 may automatically begin filling the buffer 506b with messages based on the dependency 512 between the buffers 506a, 506b. The processor core 122 may assign the message buffer 506 to an aggregator block 504 and assign dependencies by sending one or more commands to the host fabric interface 124.

In block 614 the computing node 102b initializes an event counter 508 associated with each message buffer 506 to count bytes received from the initiator computing node 102a. Counting bytes rather than messages may allow the computing node 102b to generate events when a buffer 506 is filled. The processor core 122 may initialize the event counter 508 by sending one or more commands to the host fabric interface 124. The computing node 102b may initialize an event counter 508 for each message buffer 506 that receives messages from the initiator computing node 102a. Although illustrated as counting bytes, it should be understood that each event counter 508 may be configured to count any measure indicative of the size of the messages received.

In block 616, the computing node 102b initializes an event trigger 510 associated with the message buffer 506 with a number of bytes. The number of bytes used for the event trigger 510 may be based on the size of the message buffer 506. For example, the number of bytes may be equal to the size of the message buffer 506. However, in many embodiments the number of bytes used for the event trigger 510 may be less than the size of the message buffer 506, to allow extra space in the message buffer 506 to store the last message without truncation. Additionally or alternatively, instead of truncating messages, if reordering messages is allowed, the computing node 102b may place larger messages into the message buffer 506 of the next aggregator block 504, and then place a smaller following message into the original buffer 506. The computing node 102b may use any appropriate technique to initialize the event trigger 510. For example, in some embodiments, the computing node 102b may generate a triggered put message directed at the current computing node 102b, triggered on the number of bytes. The triggered put message may be processed by the host fabric interface 124. The computing node 102b may initialize an event trigger 510 for each message buffer 506 that will receive messages from the initiator computing node 102a.

After initializing the event triggers 510 in blocks 610, 616, the method 600 proceeds in parallel to blocks 618, 622. As described further below, the block 618 may be executed by a processor core 122 of computing node 102a, and the block 622 may be executed by the host fabric interface 124 of the computing node 102a. In block 618, the computing node 102b monitors the event queue 502 for a completion event. As described above, the event queue 502 may be embodied as a buffer or other structure in the memory 128 such as a circular buffer. The computing node 102b may use any technique to monitor the event queue 502, including polling the event queue 502 for changes, blocking on the event queue, waiting for an interrupt, or any other appropriate technique. For example, the processor core 122, executing the application 304, may repeatedly read the event queue 502 from memory to detect a new completion event. As described further below, the host fabric interface 124 may independently write the completion event to the event queue 502 while the processor core 122 is monitoring the event queue 502. In block 620, the computing node 102 determines whether a completion event has been detected. If not, the method 600 loops back to block 618 to continue monitoring the event queue 502. If a completion event has been detected, the method 600 advances to block 634, described below.

Referring back to blocks 610, 616, as described above, after initializing the event triggers 510, the method 600 advances in parallel to the blocks 618, 622. In block 622, the host fabric interface 124 of the computing node 102b monitors for a message (e.g., a get message, a put message, an atomic operation, etc.) from the initiator computing node 102a. As described above, the host fabric interface 124 monitors for messages at the same time that the processor core 122 may monitor the event queue 502. In block 624, the host fabric interface 124 determines whether message has been received. If not, the method 600 loops back to block 622 to continue monitoring for messages. If a message has been received, the method 600 advances to block 626.

In block 626, the host fabric interface 124 increments an event counter 508. The host fabric interface 124 increments the event counter 508 that is associated with the aggregator block 504 and/or the message buffer 506 that received the message from the initiator computing node 102a. As described above, the event counter 508 may have been configured to increment by one (i.e., to count messages) or to increment by the number of bytes received (or other measure indicative of the size of the message received). The event counter 508 may be embodied as any storage location that may be accessed by the host fabric interface 124. For example, the event counter 508 may be embodied as a location in the memory 128 and/or a cache, register, or other memory location local to the host fabric interface 124. The event counter 508 may be accessible to the processor core 122 (for example, through a coherent cache); however, as described above in connection with the block 618, the processor core 122 monitors the event queue 502 and not the event counter 508.

In block 628, the host fabric interface 124 determines whether the event trigger 510 has been satisfied. For example, the host fabric interface 124 may compare the value of the event counter 508 with a predefined value that was assigned by a processor core 122 as described above in connection with blocks 610, 616. Thus, the event trigger 510 may be satisfied after the host fabric interface 124 has received a number of messages equal to the number of messages expected to be transmitted, or after the host fabric interface 124 has received a predefined amount of data. If the event trigger 510 is not satisfied, the method 600 loops back to block 622 to continue monitoring for messages. If the event trigger 510 is satisfied, the method 600 advances to block 630.

In block 630, the host fabric interface 124 writes a completion event to the event queue 502. As described above, the event queue 502 may be embodied as a buffer or other structure in the memory 128. The completion event may include data that may be used to identify the aggregator block 504 and/or message buffer 506 that generated the completion event. For example, in systems similar to the Portals network programming interface, the completion event may be generated by a triggered put message to the computing node 102b. When the trigger of the triggered put (i.e., the event trigger 510) is satisfied, the host fabric interface 124 writes the completion event to the event queue 502. The triggered put may be configured to generate a full event with an appropriate user_ptr field that describes the appropriate aggregator block 504. Additionally or alternatively, in some embodiments the host fabric interface 124 may write a completion event in response to AUTO_UN-LINK/AUTO_FREE events that are generated automatically when the buffer 506 is full and the list entry is unlinked. In some embodiments, in block 632 the host fabric interface 124 may automatically receive messages from the initiator computing node 102a in the next message buffer 506, as determined by dependencies established between the aggregator blocks 504. For example, as illustrated in FIG. 5, the host fabric interface 124 of the computing node 102b may automatically receive messages in the message buffer 506b after the message buffer 506a is filled, based on the dependency 512 between the message buffers 506a, 506b. Thus, the computing node 102b may continue to receive messages after a buffer has been filled and a completion event has been generated. As described above, after the completion event is written to the event queue 502, execution of the method 600 from block 620 joins execution of the method 600 from block 632, and the method 600 proceeds to block 634.

In block 634, the computing node 102b processes the message buffer 506 associated with the completion event. The application 304, executed by a processor core 122, may copy the contents of the buffer 506 to another location in the memory 128 or otherwise process the messages received in the buffer 506. The processor core 122 may also free, unlink, or otherwise make the message buffer 506 and the associated aggregator block 504 available for re-use. For example, in some embodiments, the processor core 122 may unlink the message buffer 506 from a linked list of message buffers 506 and then re-link the message buffer 506 at the end of the linked list, making the message buffer 506 available for re-use. After processing the message buffer 506, the method 600 loops back to block 602, in which the computing node 102b may prepare to receive additional messages from the initiator computing node 102a.

EXAMPLES

Illustrative examples of the technologies disclosed herein are provided below. An embodiment of the technologies may include any one or more, and any combination of, the examples described below.

Example 1 includes a computing node for aggregate message processing, the computing node comprising messaging circuitry to (i) receive a message from a remote computing node, (ii) increment an event counter of the computing node in response to receipt of the message, (iii) determine whether an event trigger is satisfied in response to an increment of the event counter, (iv), and write a completion event to an event queue in response to a determination that the event trigger is satisfied, wherein the event queue is included in a memory of the computing node; and application circuitry to monitor, by an application of the computing node, the event queue for the completion event.

Example 2 includes the subject matter of Example 1, and further including a host fabric interface, wherein the host fabric interface comprises the messaging circuitry; and a processor core, wherein the processor core comprises the application circuitry.

Example 3 includes the subject matter of any of Examples 1 and 2, and wherein to write the completion event to the event queue comprises to process, by the host fabric interface, a triggered put message to the computing node.

Example 4 includes the subject matter of any of Examples 1-3, and wherein to monitor the event queue comprises to poll the event queue in the memory.

Example 5 includes the subject matter of any of Examples 1-4, and wherein to monitor the event queue comprises to block on the event queue.

Example 6 includes the subject matter of any of Examples 1-5, and wherein the application circuitry is further to determine, by the application, whether the completion event has been written to the event queue in response to a monitoring of the event queue; and process, by the application, a message buffer in response to a determination that the completion event has been written to the event queue, wherein the message buffer is included in the memory of the computing node.

Example 7 includes the subject matter of any of Examples 1-6, and wherein the computing node comprises an initiator computing node; the remote computing node comprises a target computing node; the application circuitry is further to write, by the application, an initiator message in a message buffer, wherein the message buffer is included in the memory of the computing node; the messaging circuitry is further to transmit the initiator message from the message buffer to the remote computing node; to receive the message from the remote computing node comprises to receive an acknowledgement message from the remote computing node in response to transmission of the initiator message; and to increment the event counter comprises to increment the event counter in response to receipt of the acknowledgement message.

Example 8 includes the subject matter of any of Examples 1-7, and wherein the application circuitry is further to write, by the application, a plurality of initiator messages in the message buffer, wherein the plurality of initiator messages includes the initiator message; and to determine whether the event trigger is satisfied comprises to compare the event counter to a count of the plurality of initiator messages.

Example 9 includes the subject matter of any of Examples 1-8, and further including a host fabric interface, wherein the host fabric interface comprises the messaging circuitry; and a processor core, wherein the processor core comprises the application circuitry.

Example 10 includes the subject matter of any of Examples 1-9, and wherein the computing node comprises a target computing node; the remote computing node comprises an initiator computing node; to receive the message from the remote computing node comprises to receive an initiator message in a message buffer of the computing node, wherein the message buffer is included in the memory of the computing node; and to increment the event counter comprises to increment the event counter in response to receipt of the initiator message.

Example 11 includes the subject matter of any of Examples 1-10, and wherein to increment the event counter comprises to increment the event counter by one in response to the receipt of the initiator message; and to determine whether the event trigger is satisfied comprises to compare the event counter to a predetermined count of initiator messages.

Example 12 includes the subject matter of any of Examples 1-11, and wherein to increment the event counter comprises to increment the event counter based on a size of the initiator message; and to determine whether the event trigger is satisfied comprises to determine whether the event counter has a predefined relationship to a size of the message buffer.

Example 13 includes the subject matter of any of Examples 1-12, and further including a host fabric interface, wherein the host fabric interface comprises the messaging circuitry; wherein the messaging circuitry is further to receive a second initiator message in a second message buffer in response to the determination that the event trigger is satisfied, wherein the second message buffer is included in the memory of the computing node and a dependency is established between the message buffer and the second message buffer.

Example 14 includes the subject matter of any of Examples 1-13, and further including a host fabric interface, wherein the host fabric interface comprises the messaging circuitry; wherein to determine whether the event trigger is satisfied comprises to determine whether the message buffer is full.

Example 15 includes a method for aggregate message processing, the method comprising receiving, by a computing node, a message from a remote computing node; incrementing, by the computing node, an event counter of the computing node in response to receiving the message; determining, by the computing node, whether an event trigger is satisfied in response to incrementing the event counter; writing, by the computing node, a completion event to an event queue in response to determining that the event trigger is satisfied, wherein the event queue is included in a memory of the computing node; and monitoring, by an application of the computing node, the event queue for the completion event.

Example 16 includes the subject matter of Example 15, and wherein incrementing the event counter comprises incrementing the event counter by a host fabric interface of the computing node; determining whether the event trigger is satisfied comprises determining, by the host fabric interface, whether the event trigger is satisfied; writing the completion event to the event queue comprises writing the completion event to the event queue by the host fabric interface; and monitoring the event queue comprises monitoring the event queue by a processor core of the computing node.

Example 17 includes the subject matter of any of Examples 15 and 16, and wherein writing the completion event to the event queue by the host fabric interface comprises processing, by the host fabric interface, a triggered put message to the computing node.

Example 18 includes the subject matter of any of Examples 15-17, and wherein monitoring the event queue comprises polling the event queue in the memory.

Example 19 includes the subject matter of any of Examples 15-18, and wherein monitoring the event queue comprises blocking on the event queue.

Example 20 includes the subject matter of any of Examples 15-19, and further including determining, by the application of the computing node, whether the completion event has been written to the event queue in response to monitoring the event queue; and processing, by the application of the computing node, a message buffer in response to determining the completion event has been written to the event queue, wherein the message buffer is included in the memory of the computing node.

Example 21 includes the subject matter of any of Examples 15-20, and wherein the computing node comprises an initiator computing node and the remote computing node comprises a target computing node, the method further comprising writing, by the application of the computing node, an initiator message in a message buffer, wherein the message buffer is included in the memory of the computing node; and transmitting, by the computing node, the initiator message from the message buffer to the remote computing node; wherein receiving the message from the remote computing node comprises receiving an acknowledgement message from the remote computing node in response to transmitting the initiator message; and wherein incrementing the event counter comprises incrementing the event counter in response to receiving the acknowledgement message.

Example 22 includes the subject matter of any of Examples 15-21, and further including writing, by the application of the computing node, a plurality of initiator messages in the message buffer, wherein the plurality of initiator messages includes the initiator message; wherein determining whether the event trigger is satisfied comprises comparing the event counter to a count of the plurality of initiator messages.

Example 23 includes the subject matter of any of Examples 15-22, and wherein writing the message in the message buffer comprises writing the message in the message buffer by a processor core of the computing node.

Example 24 includes the subject matter of any of Examples 15-23, and wherein the computing node comprises a target computing node; the remote computing node comprises an initiator computing node; receiving the message from the remote computing node comprises receiving an initiator message in a message buffer of the computing node, wherein the message buffer is included in the memory of the computing node; and incrementing the event counter comprises incrementing the event counter in response to receiving the initiator message.

Example 25 includes the subject matter of any of Examples 15-24, and wherein incrementing the event counter comprises incrementing the event counter by one in response to receiving the initiator message; and determining whether the event trigger is satisfied comprises comparing the event counter to a predetermined count of initiator messages.

Example 26 includes the subject matter of any of Examples 15-25, and wherein incrementing the event counter comprises incrementing the event counter based on a size of the initiator message; and determining whether the event trigger is satisfied comprises determining whether the event counter has a predefined relationship to a size of the message buffer.

Example 27 includes the subject matter of any of Examples 15-26, and further including receiving, by a host fabric interface of the computing node, a second initiator message in a second message buffer in response to determining that the event trigger is satisfied, wherein the second message buffer is included in the memory of the computing node and a dependency is established between the message buffer and the second message buffer.

Example 28 includes the subject matter of any of Examples 15-27, and wherein determining whether the event trigger is satisfied comprises determining, by a host fabric interface of the computing node, whether the message buffer is full.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device comprising means for performing the method of any of includes 15-28.

Example 32 includes a computing node for aggregate message processing, the computing node comprising means for receiving a message from a remote computing node; means for incrementing an event counter of the computing node in response to receiving the message; means for determining whether an event trigger is satisfied in response to incrementing the event counter; means for writing a completion event to an event queue in response to determining that the event trigger is satisfied, wherein the event queue is included in a memory of the computing node; and means for monitoring, by an application of the computing node, the event queue for the completion event.

Example 33 includes the subject matter of Example 32, and wherein the means for incrementing the event counter comprises means for incrementing the event counter by a host fabric interface of the computing node; the means for determining whether the event trigger is satisfied comprises means for determining, by the host fabric interface, whether the event trigger is satisfied; the means for writing the completion event to the event queue comprises means for writing the completion event to the event queue by the host fabric interface; and the means for monitoring the event queue comprises means for monitoring the event queue by a processor core of the computing node.

Example 34 includes the subject matter of any of Examples 32 and 33, and wherein the means for writing the completion event to the event queue by the host fabric interface comprises means for processing, by the host fabric interface, a triggered put message to the computing node.

Example 35 includes the subject matter of any of Examples 32-34, and wherein the means for monitoring the event queue comprises means for polling the event queue in the memory.

Example 36 includes the subject matter of any of Examples 32-35, and wherein the means for monitoring the event queue comprises means for blocking on the event queue.

Example 37 includes the subject matter of any of Examples 32-36, and further including means for determining, by the application of the computing node, whether the completion event has been written to the event queue in response to monitoring the event queue; and means for processing, by the application, a message buffer in response to determining the completion event has been written to the event queue, wherein the message buffer is included in the memory of the computing node.

Example 38 includes the subject matter of any of Examples 32-37, and wherein the computing node comprises an initiator computing node and the remote computing node comprises a target computing node, the computing node further comprising means for writing, by the application of the computing node, an initiator message in a message buffer, wherein the message buffer is included in the memory of the computing node; and means for transmitting the initiator message from the message buffer to the remote computing node; wherein the means for receiving the message from the remote computing node comprises means for receiving an acknowledgement message from the remote computing node in response to transmitting the initiator message; and wherein the means for incrementing the event counter comprises means for incrementing the event counter in response to receiving the acknowledgement message.

Example 39 includes the subject matter of any of Examples 32-38, and further including means for writing, by the application of the computing node, a plurality of initiator messages in the message buffer, wherein the plurality of initiator messages includes the initiator message; wherein the means for determining whether the event trigger is satisfied comprises means for comparing the event counter to a count of the plurality of initiator messages.

Example 40 includes the subject matter of any of Examples 32-39, and wherein the means for writing the message in the message buffer comprises means for writing the message in the message buffer by a processor core of the computing node.

Example 41 includes the subject matter of any of Examples 32-40, and wherein the computing node comprises a target computing node; the remote computing node comprises an initiator computing node; the means for receiving the message from the remote computing node comprises means for receiving an initiator message in a message buffer of the computing node, wherein the message buffer is included in the memory of the computing node; and the means for incrementing the event counter comprises means for incrementing the event counter in response to receiving the initiator message.

Example 42 includes the subject matter of any of Examples 32-41, and wherein the means for incrementing the event counter comprises means for incrementing the event counter by one in response to receiving the initiator message; and the means for determining whether the event trigger is satisfied comprises means for comparing the event counter to a predetermined count of initiator messages.

Example 43 includes the subject matter of any of Examples 32-42, and wherein the means for incrementing the event counter comprises means for incrementing the event counter based on a size of the initiator message; and the means for determining whether the event trigger is satisfied comprises means for determining whether the event counter has a predefined relationship to a size of the message buffer.

Example 44 includes the subject matter of any of Examples 32-43, and further including means for receiving, by a host fabric interface of the computing node, a second initiator message in a second message buffer in response to determining that the event trigger is satisfied, wherein the second message buffer is included in the memory of the computing node and a dependency is established between the message buffer and the second message buffer.

Example 45 includes the subject matter of any of Examples 32-44, and wherein the means for determining whether the event trigger is satisfied comprises means for determining, by a host fabric interface of the computing node, whether the message buffer is full.

The invention claimed is:

1. A computing node for aggregate message processing, the computing node comprising:
   messaging circuitry to (i) receive a message from a remote computing node in a message buffer, (ii) increment, by a network interface controller of the computing node, an event counter of the computing node based on a size of the message in response to receipt of the message, (iii) determine, by the network interface controller, whether an event trigger is satisfied in response to an increment of the event counter, wherein to determine whether the event trigger is satisfied comprises to determine whether the event counter has a predefined relationship to a size of the message buffer, (iv), and write, by the network interface controller, a completion event to an event queue in response to a determination that the event trigger is satisfied, wherein the event queue is included in a memory of the computing node, and wherein the event queue is located at a first cache line of the memory and the event counter is located at a second cache line of the memory other than the first cache line, and wherein the memory is separate from the network interface controller; and
   application circuitry to monitor, by an application executed by a processor core of the computing node, the event queue in the memory for the completion event, wherein to monitor the event queue in the memory comprises to access the memory by the processor core via a coherent cache.

2. The computing node of claim 1, further comprising:
   a host fabric interface, wherein the host fabric interface comprises the network interface controller; and
   a processor, wherein the processor comprises the processor core and the host fabric interface.

3. The computing node of claim 2, wherein to write the completion event to the event queue comprises to process, by the host fabric interface, a triggered put message to the computing node.

4. The computing node of claim 1, wherein to monitor the event queue comprises to poll the event queue in the memory.

5. The computing node of claim 1, wherein the application circuitry is further to:
   determine, by the application, whether the completion event has been written to the event queue in response to a monitoring of the event queue; and
   process, by the application, a message buffer in response to a determination that the completion event has been written to the event queue, wherein the message buffer is included in the memory of the computing node.

6. The computing node of claim 1, wherein:
   the computing node comprises an initiator computing node;
   the remote computing node comprises a target computing node;
   the application circuitry is further to write, by the application, an initiator message in a message buffer, wherein the message buffer is included in the memory of the computing node;
   the messaging circuitry is further to transmit the initiator message from the message buffer to the remote computing node;
   to receive the message from the remote computing node comprises to receive an acknowledgement message from the remote computing node in response to transmission of the initiator message; and
   to increment the event counter comprises to increment the event counter in response to receipt of the acknowledgement message.

7. The computing node of claim 6, wherein:
   the application circuitry is further to write, by the application, a plurality of initiator messages in the message buffer, wherein the plurality of initiator messages includes the initiator message; and
   to determine whether the event trigger is satisfied comprises to compare the event counter to a count of the plurality of initiator messages.

8. The computing node of claim 1, wherein:
   the computing node comprises a target computing node;
   the remote computing node comprises an initiator computing node;
   to receive the message from the remote computing node comprises to receive an initiator message in the message buffer of the computing node, wherein the message buffer is included in the memory of the computing node; and
   to increment the event counter comprises to increment the event counter in response to receipt of the initiator message.

9. The computing node of claim 1, further comprising:
   a host fabric interface, wherein the host fabric interface comprises the messaging circuitry;
   wherein to determine whether the event trigger is satisfied comprises to determine whether the message buffer is full.

10. A method for aggregate message processing, the method comprising:
    receiving, by a computing node, a message from a remote computing node in a message buffer;

incrementing, by a network interface controller of the computing node, an event counter of the computing node based on a size of the message in response to receiving the message;

determining, by the network interface controller of the computing node, whether an event trigger is satisfied in response to incrementing the event counter, wherein determining whether the event trigger is satisfied comprises determining whether the event counter has a predefined relationship to a size of the message buffer;

writing, by the network interface controller of the computing node, a completion event to an event queue in response to determining that the event trigger is satisfied, wherein the event queue is included in a memory of the computing node, and wherein the event queue is located at a first cache line of the memory and the event counter is located at a second cache line of the memory other than the first cache line, and wherein the memory is separate from the network interface controller; and monitoring, by an application executed by a processor core of the computing node, the event queue in the memory for the completion event, wherein monitoring the event queue in the memory comprises accessing the memory by the processor core via a coherent cache.

11. The method of claim 10, wherein monitoring the event queue comprises polling the event queue in the memory.

12. The method of claim 10, further comprising:
determining, by the application of the computing node, whether the completion event has been written to the event queue in response to monitoring the event queue; and processing, by the application of the computing node, a message buffer in response to determining the completion event has been written to the event queue, wherein the message buffer is included in the memory of the computing node.

13. The method of claim 10, wherein the computing node comprises an initiator computing node and the remote computing node comprises a target computing node, the method further comprising:
writing, by the application of the computing node, an initiator message in a message buffer, wherein the message buffer is included in the memory of the computing node; and transmitting, by the computing node, the initiator message from the message buffer to the remote computing node;

wherein receiving the message from the remote computing node comprises receiving an acknowledgement message from the remote computing node in response to transmitting the initiator message; and wherein incrementing the event counter comprises incrementing the event counter in response to receiving the acknowledgement message.

14. The method of claim 13, further comprising:
writing, by the application of the computing node, a plurality of initiator messages in the message buffer, wherein the plurality of initiator messages includes the initiator message;

wherein determining whether the event trigger is satisfied comprises comparing the event counter to a count of the plurality of initiator messages.

15. The method of claim 10, wherein:
the computing node comprises a target computing node;
the remote computing node comprises an initiator computing node;
receiving the message from the remote computing node comprises receiving an initiator message in the message buffer of the computing node, wherein the message buffer is included in the memory of the computing node; and incrementing the event counter comprises incrementing the event counter in response to receiving the initiator message.

16. One or more non-transitory, computer-readable storage media comprising a plurality of instructions that in response to being executed cause a computing node to:
receive a message from a remote computing node in a message buffer;

increment, by a network interface controller of the computing node, an event counter of the computing node based on a size of the message in response to receiving the message;

determine, by the network interface controller, whether an event trigger is satisfied in response to incrementing the event counter, wherein to determine whether the event trigger is satisfied comprises to determine whether the event counter has a predefined relationship to a size of the message buffer;

write, by the network interface controller, a completion event to an event queue in response to determining that the event trigger is satisfied, wherein the event queue is included in a memory of the computing node, and wherein the event queue is located at a first cache line of the memory and the event counter is located at a second cache line of the memory other than the first cache line, and wherein the memory is separate from the network interface controller; and monitor, by an application executed by a processor core of the computing node, the event queue in the memory for the completion event, wherein to monitor the event queue in the memory comprises to access the memory by the processor core via a coherent cache.

17. The one or more non-transitory, computer-readable storage media of claim 16, wherein to monitor the event queue comprises to poll the event queue in the memory.

18. The one or more non-transitory, computer-readable storage media of claim 16, further comprising a plurality of instructions that in response to being executed cause the computing node to:
determine, by the application of the computing node, whether the completion event has been written to the event queue in response to monitoring the event queue; and process, by the application, a message buffer in response to determining the completion event has been written to the event queue, wherein the message buffer is included in the memory of the computing node.

19. The one or more non-transitory, computer-readable storage media of claim 16, wherein the computing node comprises an initiator computing node and the remote computing node comprises a target computing node, the computing node further comprising a plurality of instructions that in response to being executed cause the computing node to:
write, by the application of the computing node, an initiator message in a message buffer, wherein the message buffer is included in the memory of the computing node; and transmit the initiator message from the message buffer to the remote computing node;

wherein to receive the message from the remote computing node comprises to receive an acknowledgement message from the remote computing node in response to transmitting the initiator message; and wherein to increment the event counter comprises to increment the event counter in response to receiving the acknowledgement message.

20. The one or more non-transitory, computer-readable storage media of claim 19, further comprising a plurality of instructions that in response to being executed cause the computing node to:

write, by the application of the computing node, a plurality of initiator messages in the message buffer, wherein the plurality of initiator messages includes the initiator message;

wherein to determine whether the event trigger is satisfied comprises to compare the event counter to a count of the plurality of initiator messages.

21. The one or more non-transitory, computer-readable storage media of claim 16, wherein:

the computing node comprises a target computing node;

the remote computing node comprises an initiator computing node;

to receive the message from the remote computing node comprises to receive an initiator message in the message buffer of the computing node, wherein the message buffer is included in the memory of the computing node; and to increment the event counter comprises to increment the event counter in response to receiving the initiator message.

* * * * *